United States Patent
Ih et al.

(10) Patent No.: US 9,522,746 B1
(45) Date of Patent: Dec. 20, 2016

(54) ATTITUDE SLEW METHODOLOGY FOR SPACE VEHICLES USING GIMBALED LOW-THRUST PROPULSION SUBSYSTEM

(71) Applicant: The Boeing Company, Chicago, IL (US)

(72) Inventors: Che-Hang Charles Ih, Rancho Palos Verdes, CA (US); Arunkumar Pursayya Nayak, Van Nuys, CA (US); Kangsik Lee, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/838,134

(22) Filed: Aug. 27, 2015

(51) Int. Cl.
| B64G 1/26 | (2006.01) |
| B64G 1/28 | (2006.01) |
| B64G 1/40 | (2006.01) |
| G05D 1/08 | (2006.01) |
| G07C 5/08 | (2006.01) |
| B64G 1/24 | (2006.01) |

(52) U.S. Cl.
CPC ............... *B64G 1/26* (2013.01); *B64G 1/283* (2013.01); *B64G 1/405* (2013.01); *G05D 1/0883* (2013.01); *G07C 5/0808* (2013.01); *B64G 2001/245* (2013.01)

(58) Field of Classification Search
None
See application file for complete search history.

(56) References Cited

U.S. PATENT DOCUMENTS

| 5,312,073 A | * | 5/1994 | Flament | B64G 1/24 136/292 |
| 6,053,455 A | * | 4/2000 | Price | B64G 1/26 244/169 |

* cited by examiner

*Primary Examiner* — Redhwan K Mawari
*Assistant Examiner* — Edward Torchinsky
(74) *Attorney, Agent, or Firm* — Duft Bornsen & Fettig LLP

(57) ABSTRACT

Apparatus and methods for attitude control of a space vehicle. The space vehicle includes a reaction wheel subsystem and a propulsion subsystem for attitude control. A slew controller for the space vehicle detects a failure of the reaction wheel subsystem. To perform an attitude slew, the slew controller identifies a pair of thrusters in the propulsion subsystem that will rotate the space vehicle about a desired axis. The slew controller determines burn parameters for the pair of thrusters, and initiates the burns to perform the desired attitude slew.

25 Claims, 9 Drawing Sheets

ATTITUDE SLEW METHODOLOGY FOR SPACE VEHICLES USING GIMBALED LOW-THRUST PROPULSION SUBSYSTEM

FIELD

This disclosure relates to the field of space vehicles, and more particularly, to attitude control for space vehicles.

BACKGROUND

Satellites or other space vehicles are configured to orbit around a planet, such as the Earth, for a variety of purposes, such as communications, exploration, etc. For example, a geosynchronous satellite is a satellite that orbits the Earth and follows the direction of the Earth's rotation. One revolution of a geosynchronous satellite around the Earth takes about 24 hours, which is the same amount of time it takes for the Earth to rotate once about its axis. These types of satellites are considered geosynchronous because they appear stationary when viewed from a particular location on the Earth, and are commonly used as communication satellites.

When a satellite is in orbit, systems onboard the satellite are able to control the orientation of the satellite in relation to a planet, which is referred to as attitude control. For example, attitude control systems are able to control the orientation of a satellite so that instruments (e.g., antennas, telescopes, cameras, etc.) onboard the satellite point in a desired direction.

Traditional satellites use chemical thrusters (e.g., bipropellant) and/or reaction wheels for attitude control. A reaction wheel uses a spinning mass with a substantial amount of inertia. The spinning mass of the reaction wheel applies torque along an axis of the satellite causing a rotation of the satellite along that axis. Installation of a reaction wheel along three axes of the satellite, for example, allows systems to control the rotation of the satellite along all three axes. The chemical thrusters may be used to assist the reaction wheels in attitude control.

It is desirable to identify new and improved ways for controlling the attitude of space vehicles.

SUMMARY

Embodiments described herein provide attitude control for a space vehicle with a low-thrust propulsion subsystem. Even when space vehicles are equipped with reaction wheels for attitude control, there may be scenarios where one or more of the reaction wheels fail such that attitude control along three axes is not possible with the remaining reaction wheel(s). Upon failure of one or more reaction wheels, a low-thrust propulsion subsystem is used for attitude control so that the space vehicle may remain in service.

One embodiment comprises a space vehicle that includes a bus having a nadir side and a zenith side opposite the nadir side, a reaction wheel subsystem that includes a plurality of reaction wheels for controlling attitude of the space vehicle, and a propulsion subsystem that includes a plurality of thrusters installed on the zenith side of the bus each having a thrust less than 0.1 Newton. Each of the thrusters is coupled to the bus by a two-axis gimbal assembly. The space vehicle further comprises a slew controller coupled to the reaction wheel subsystem and the propulsion subsystem. The slew controller is configured to detect a failure in the reaction wheel subsystem. In response to the failure, the slew controller is configured to determine a target attitude for the space vehicle, identify a first thruster and a second thruster of the plurality of thrusters that produce an attitude slew of the space vehicle about an axis toward the target attitude, determine start parameters for the first thruster and the second thruster to initiate the attitude slew about the axis, direct the first thruster at first gimbal angles based on the start parameters so that thruster forces from the first thruster are spaced by a first moment arm from a center of mass of the space vehicle, direct the second thruster at second gimbal angles based on the start parameters so that thruster forces from the second thruster are spaced by a second moment arm from the center of mass, initiate a burn of the first thruster for a first burn duration based on the start parameters, and initiate a burn of the second thruster for a second burn duration based on the start parameters.

In another embodiment, the slew controller is configured to determine the start parameters by determining a slew rate for the attitude slew, determining a target momentum change of the space vehicle based on the slew rate, setting the first burn duration of the first thruster and the second burn duration of the second thruster at a minimum, setting the first gimbal angles of the first thruster and the second gimbal angles of the second thruster to produce thrust through the center of mass, and performing an iterative process. The iterative process includes determining an iteration momentum change of the space vehicle based on the first burn duration and the first gimbal angles of the first thruster and based on the second burn duration and the second gimbal angles of the second thruster, comparing the iteration momentum change to the target momentum change, using the first burn duration and the first gimbal angles of the first thruster, and the second burn duration and the second gimbal angles of the second thruster as the start parameters when a difference between the iteration momentum change and the target momentum change is less than a threshold, and adjusting the first gimbal angles of the first thruster and the second gimbal angles of the second thruster when the difference between the iteration momentum change and the target momentum change is greater than the threshold.

In another embodiment, the slew controller is configured to determine the start parameters by increasing the first burn duration of the first thruster and the second burn duration of the second thruster when the difference between the iteration momentum change and the target momentum change is greater than the threshold and the first gimbal angles or the second gimbal angles exceed an operational range, setting the first gimbal angles of the first thruster and the second gimbal angles of the second thruster to produce thrust through the center of mass, and repeating the iterative process.

In another embodiment, the slew controller is configured to determine the iteration momentum change of the space vehicle using:

$$\vec{h}^b = t_1(\vec{r}_1^b \times \vec{f}_1^b) + t_2(\vec{r}_2^b \times \vec{f}_2^b)$$

where $t_1$ is the first burn duration of the first thruster, $t_2$ is the second burn duration of the second thruster, $\vec{f}_1^b$ is a force vector for the first thruster, $\vec{r}_1^b$ is a moment arm vector between the force vector for the first thruster and the center of mass, $\vec{f}_2^b$ is a force vector for the second thruster, and $\vec{r}_2^b$ is a moment arm vector between the force vector for the second thruster and the center of mass.

In another embodiment, the slew controller is configured to relate the force vector and the moment arm vector for the first thruster to the first gimbal angles for the first thruster, and to relate the force vector and the moment arm vector for the second thruster to the second gimbal angles for the second thruster.

In another embodiment, the slew controller is configured to determine the start parameters with the iterative process based on a constraint that:

$$t_1 \vec{f}_1{}^\circ = t_2 \vec{f}_2{}^\circ = 0.$$

In another embodiment, the slew controller is configured to determine a drift duration where the space vehicle rotates about the axis at a constant rate, and allow the space vehicle to drift for the drift duration.

In another embodiment, the slew controller is configured to determine stop parameters for the first thruster and the second thruster to stop the attitude slew after the drift duration to achieve the target attitude, direct the first thruster at third gimbal angles based on the stop parameters so that the thruster forces from the first thruster are spaced by a third moment arm from the center of mass, direct the second thruster at fourth gimbal angles based on the stop parameters so that the thruster forces from the second thruster are spaced by a fourth moment arm from the center of mass, initiate a burn of the first thruster for a third burn duration based on the stop parameters, and initiate a burn of the second thruster for a fourth burn duration based on the stop parameters.

In another embodiment, the slew controller is configured to determine the stop parameters by determining a target momentum change of the space vehicle, setting the third burn duration of the first thruster and the fourth burn duration of the second thruster at a minimum, setting the third gimbal angles of the first thruster and the fourth gimbal angles of the second thruster to produce thrust through the center of mass, and performing an iterative process. The iterative process includes determining an iteration momentum change of the space vehicle based on the third burn duration and the third gimbal angles of the first thruster and based on the fourth burn duration and the fourth gimbal angles of the second thruster, comparing the iteration momentum change to the target momentum change, using the third burn duration and the third gimbal angles of the first thruster, and the fourth burn duration and the fourth gimbal angles of the second thruster as the stop parameters when a difference between the iteration momentum change and the target momentum change is less than a threshold, and adjusting the third gimbal angles of the first thruster and the fourth gimbal angles of the second thruster when the difference between the iteration momentum change and the target momentum change is greater than the threshold.

In another embodiment, the slew controller is configured to determine the stop parameters by increasing the third burn duration of the first thruster and the fourth burn duration of the second thruster when the difference between the iteration momentum change and the target momentum change is greater than the threshold and the third gimbal angles or the fourth gimbal angles exceed an operational range, setting the third gimbal angles of the first thruster and the fourth gimbal angles of the second thruster to produce thrust through the center of mass, and repeating the iterative process.

In another embodiment, the plurality of thrusters includes a northwest thruster, a northeast thruster, a southwest thruster, and a southeast thruster installed on the zenith side of the bus.

In another embodiment, the thrusters comprise electric thrusters, such as thrusters that use xenon as a propellant.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
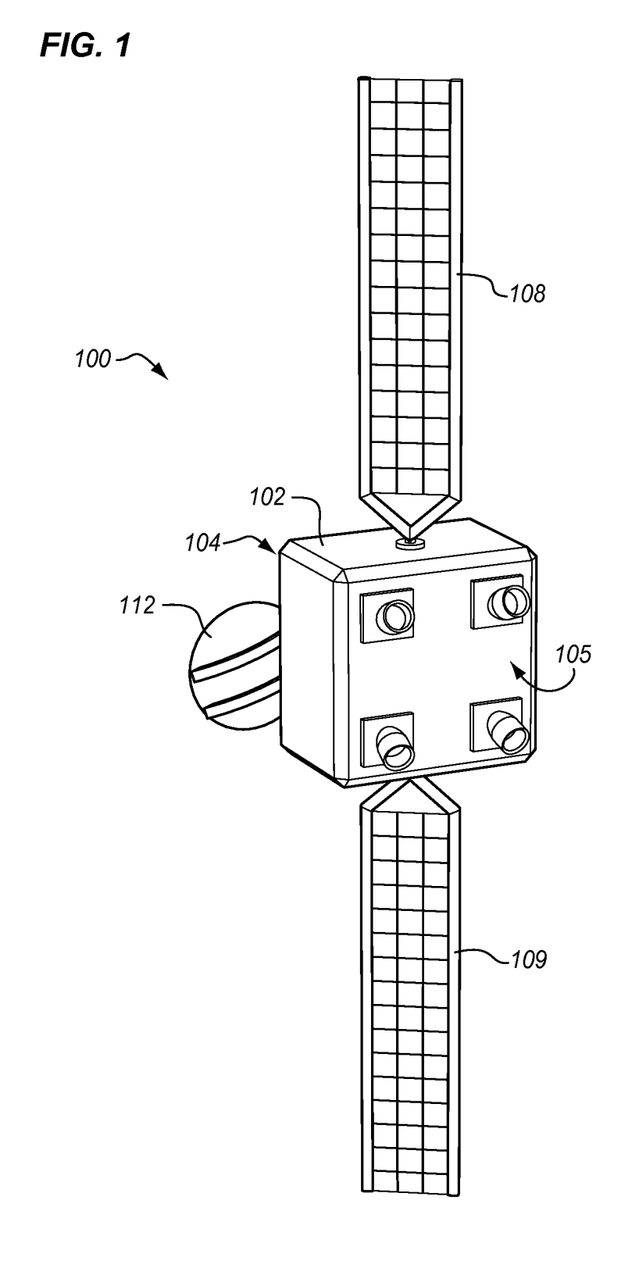
FIG. 1 illustrates a satellite in an exemplary embodiment.

FIG. 1 illustrates a satellite 100 in an exemplary embodiment. Although the term "satellite" is used herein, the embodiments described below apply to any type of space vehicle. Satellite 100 includes a main body frame that carries a payload, which is referred to as a bus 102. When viewed from the Earth or another primary body, bus 102 includes a nadir side 104 (i.e., front side) and an opposing zenith side 105 (i.e., back side or anti-nadir side). The terms "side" or "face" may be used interchangeably when discussing bus 102. Satellite 100 also includes solar wings 108-109 that are attached to bus 102, and may be used to derive electricity from the Sun to power different components on satellite 100. Satellite 100 also includes instruments or subsystems, such as one or more antennas 112 that may be used for communications. The structure of satellite 100 shown in FIG. 1 is an example, and may vary as desired.

Figure 2:
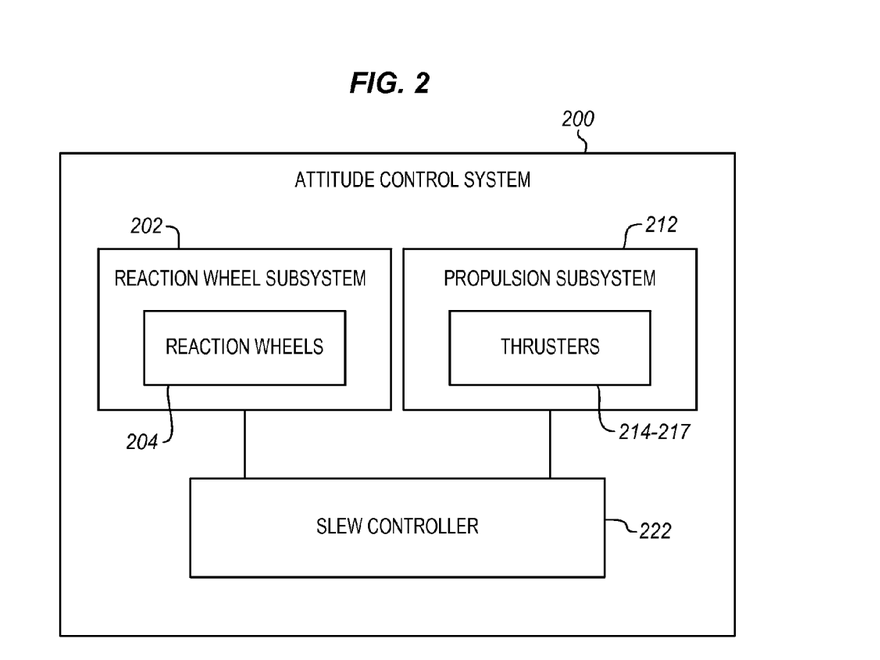
FIG. 2 is a schematic diagram of an attitude control system in an exemplary embodiment.
Figure 3:
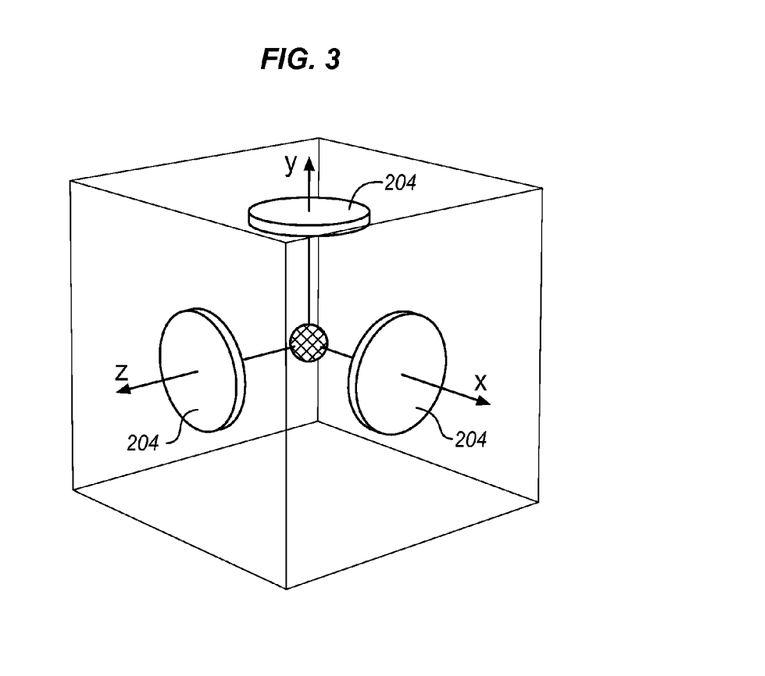
FIG. 3 illustrates a subsystem that includes a plurality of reaction wheels.

Satellite 100 is configured to orbit around a primary body, such as the Earth. For example, satellite 100 may comprise a geosynchronous satellite that orbits the Earth and follows the direction of the Earth's rotation. In order to control its attitude, satellite 100 includes an attitude control system. FIG. 2 is a schematic diagram of an attitude control system 200 in an exemplary embodiment. Attitude control system 200 includes a reaction wheel subsystem 202 and a propulsion subsystem 212. Reaction wheel subsystem 202 is a system that uses a plurality of reaction wheels 204 that are able to alter the orientation or attitude of satellite 100. FIG. 3 illustrates a subsystem that includes a plurality of reaction wheels. A reaction wheel 204 is installed along an x-axis, a y-axis, and a z-axis of the body shown in FIG. 3. Each of the reaction wheels 204 is able to spin in a desired direction to impart rotation along its corresponding axis. A reaction wheel subsystem such as this may be implemented in satellite 100, however the structure of the reaction wheel subsystem or the number of reaction wheels used in the subsystem for satellite 100 is not limited to the structure shown in FIG. 3. For example, redundant reaction wheels may be implemented along each axis in other embodiments. Also, reaction wheels may be implemented in a tetrahedron configuration or another configuration in other embodiments.

In FIG. 2, propulsion subsystem 212 is a system that uses a plurality of thrusters 214-217 to alter the orientation or attitude of satellite 100. Each of thrusters 214-217 is referred to herein as "low-thrust", which means they produce thrust that is less than 0.1 Newton. Thrusters 214-217 may comprise electric thrusters, which are a type of thruster that produces electric thrust by accelerating ions. In a typical electric thruster, a propellant (e.g., xenon) is injected into an ionization chamber and ionized by electron bombardment. The ions are then accelerated by an electromagnetic field, and emitted from the thruster as exhaust that produces thrust. One example of an electric thruster is a Xenon Ion Propulsion System (XIPS©) manufactured by L-3 Communications of Aurora, Colo. Thrusters 214-217 may alternatively comprise quantum vacuum thrusters (with a thrust level of 1000-4000 micro Newton), or pulsed plasma thrusters (with a thrust level of 860 micro Newton). Thrusters 214-217 may alternatively comprise chemical thrusters. A chemical thruster is a type of thruster that burns liquid propellant to produce thrust. One type of chemical thruster is referred to as a bipropellant (or biprop) thruster that burns a liquid fuel and a liquid oxidizer in a combustion chamber. A chemical thruster may be used for thrusters 214-217 as long as the thrust is less than 0.1 Newton.

Figure 4:
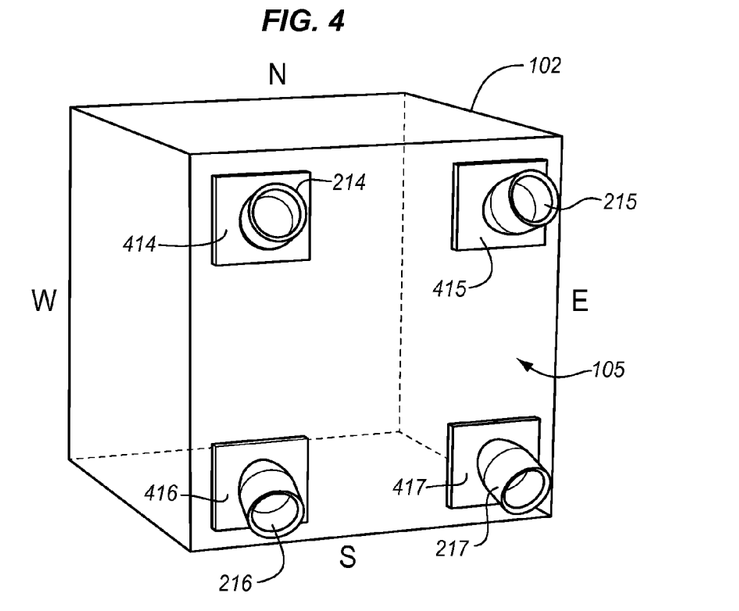
FIG. 4 illustrates a propulsion subsystem in an exemplary embodiment.

FIG. 4 illustrates propulsion subsystem 212 in an exemplary embodiment. The view in FIG. 4 is of the zenith side 105 of satellite bus 102. The top side of bus 102 is referred to as the north side (indicated by "N"), and the bottom side of bus 102 is referred to as the south side (indicated by "S"). The left side of bus 102 in FIG. 4 is referred to as the west side (indicated by "W"), and the right side of bus 102 in FIG. 4 is referred to as the east side (indicated by "E"). The zenith side 105 of bus 102 includes thrusters 214-217 that are part of propulsion subsystem 212.

Thrusters 214-217 are respectively positioned in northwest, northeast, southwest, and southeast regions of zenith side 105 in this embodiment. Each thruster 214-217 is coupled to bus 102 by a gimbal assembly. For example, northwest thruster 214 is coupled to bus 102 by gimbal assembly 414, northeast thruster 215 is coupled to bus 102 by gimbal assembly 415, southwest thruster 216 is coupled to bus 102 by gimbal assembly 416, and southeast thruster 217 is coupled to bus 102 by gimbal assembly 417. Each gimbal assembly 414-417 is configured to pivot along two axes to alter the thrust vector of its corresponding thruster 214-217. The gimbal angles for each gimbal assembly are referred to herein as ρ and γ. Although not specifically shown in FIG. 4, gimbal assemblies 414-417 may include gimbals or gimbal units, rotary motors that control movement of the gimbals, and rotary encoders that determine the mechanical position of the gimbals.

The number or positions of thrusters 214-217 as shown in FIG. 4 provide an exemplary configuration, and other thruster configurations may be used in other embodiments. Also, other thrusters may be used on satellite 100 for stationkeeping maneuvers that are not illustrated in FIG. 4.

Figure 5:
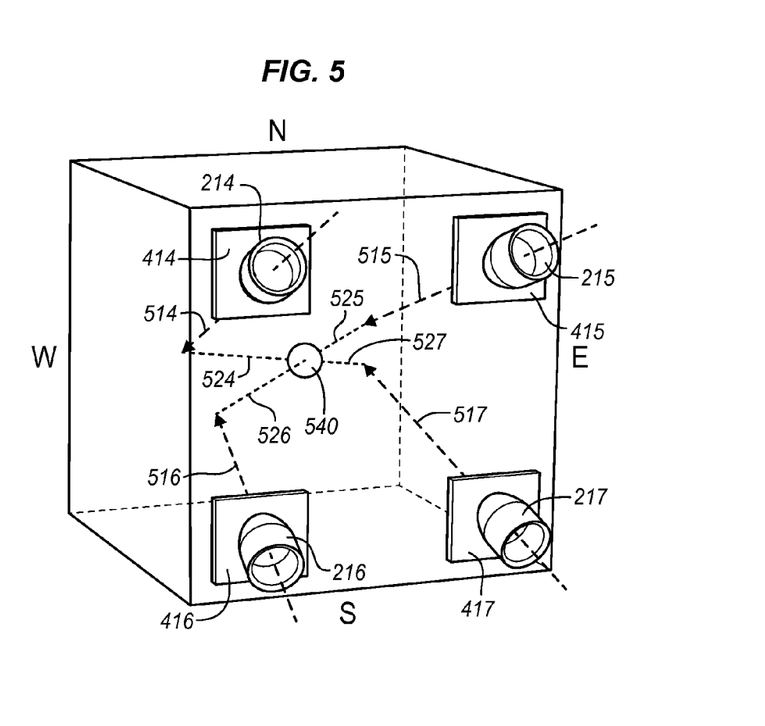
FIG. 5 illustrates thrust lines of thrusters for a propulsion subsystem in an exemplary embodiment.

FIG. 5 illustrates the thrust lines of thrusters 214-217 for propulsion subsystem 212 in an exemplary embodiment. Thrust line 514 represents the direction of thrust forces produced by thruster 214. Thrust line 515 represents the direction of thrust forces produced by thruster 215. Thrust line 516 represents the direction of thrust forces produced by thruster 216. Thrust line 517 represents the direction of thrust forces produced by thruster 217. The thrust lines for each thruster 214-217 may be altered from what is shown in FIG. 5 because thrusters 214-217 are gimballed. To alter the attitude of satellite 100, thrusters 214-217 can be directed so that their thrust lines are spaced by moment arms from the center of mass 540 of satellite 100. For instance, thrust line 514 is spaced from center of mass 540 by moment arm 524, thrust line 515 is spaced from center of mass 540 by moment arm 525, thrust line 516 is spaced from center of mass 540 by moment arm 526, and thrust line 517 is spaced from center of mass 540 by moment arm 527. A thruster 214-217 directed to have a moment arm R and generating a force F can induce a torque T in satellite 100 (i.e., T=R×F). Therefore, the attitude of satellite 100 may be controlled based on the moment arms and the force (or amount of thrust) of thrusters 214-217. To apply torques to satellite 100 for attitude control, each of thrusters 214-217 can be redirected to form a moment arm with the satellite's center of mass 540.

Attitude control system 200 as shown in FIG. 2 also includes a slew controller 222 that is coupled to reaction wheel subsystem 202 and propulsion subsystem 212. Slew controller 222 comprises devices, components, or modules (including hardware, software, or a combination of hardware and software) that control the orientation or attitude of satellite 100. Slew controller 222 may be located on Earth, and able to communicate with reaction wheel subsystem 202 and/or propulsion subsystem 212 via wireless signals. Slew controller 222 may alternatively be located on satellite 100. Slew controller 222 may alternatively be modularized with a portion of slew controller 222 located on Earth, and a portion located locally on satellite 100.

Figure 6:
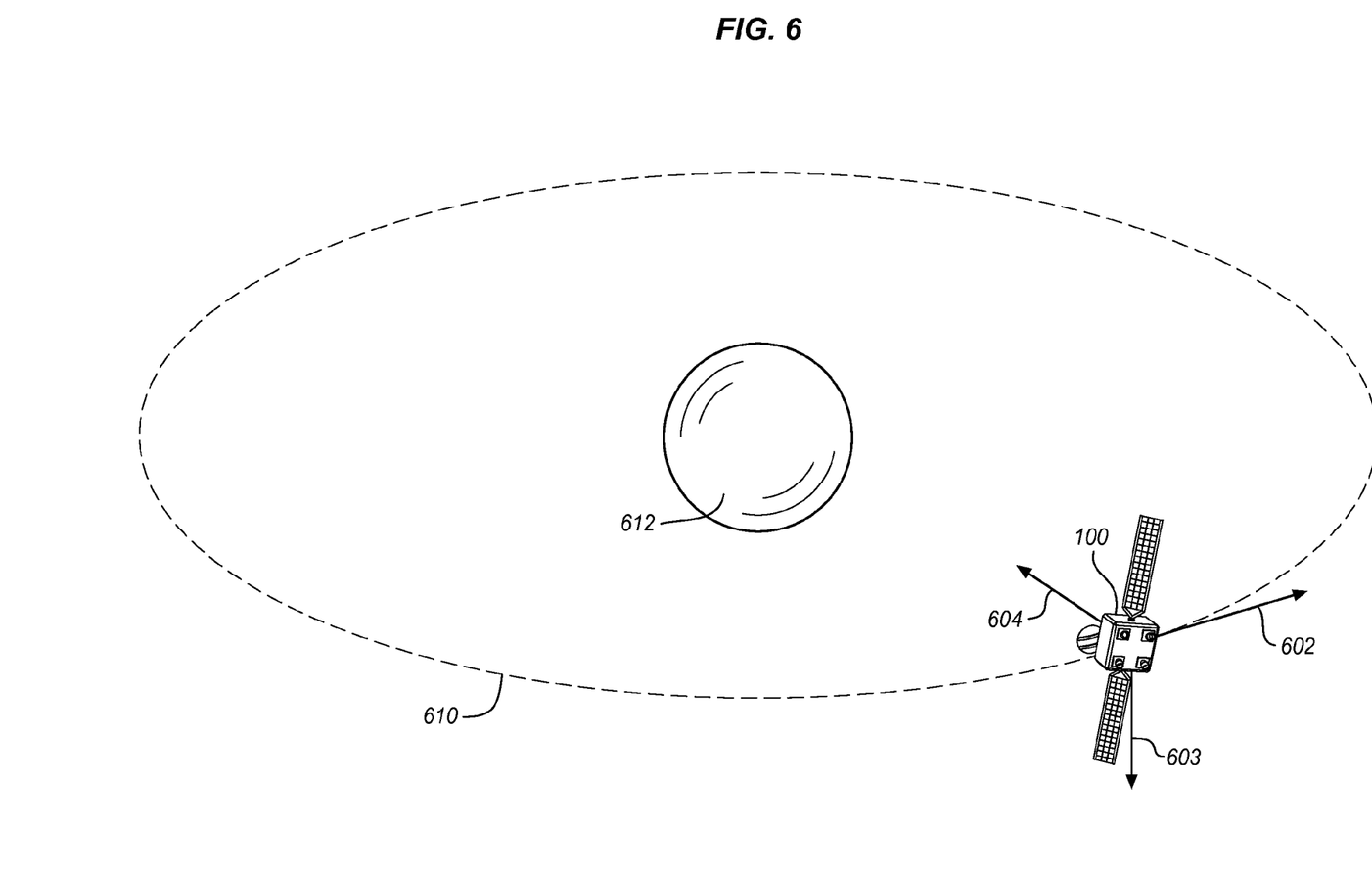
FIG. 6 illustrates a satellite in an orbit in an exemplary embodiment.

FIG. 6 illustrates satellite 100 in an orbit in an exemplary embodiment. The attitude of satellite 100 may be defined with reference to a coordinate system having a roll axis 602, a pitch axis 603, and a yaw axis 604. Pitch axis 603 is orthogonal to the orbit plane 610 of satellite 100, yaw axis 604 is directed at the planet (e.g., Earth) 612 around which satellite 100 is orbiting, and roll axis 602 is orthogonal to the other two axes.

Slew controller 222 (see FIG. 2) communicates with reaction wheel subsystem 202 and propulsion subsystem 212 to control the attitude of satellite. As part of attitude control, slew controller 222 may implement any combination of maneuvers with reaction wheel subsystem 202 and propulsion subsystem 212. There may be instances where one or more of reaction wheels 204 become inoperable so that reaction wheel subsystem 202 can no longer perform attitude control. When a failure occurs, slew controller 222 may solely use propulsion subsystem 212 for attitude control so that satellite 100 may remain in service. For attitude control with propulsion subsystem 212, slew controller 222 performs a maneuver with a pair of thrusters 214-217 to initiate a slew of satellite 100 about an axis toward a target attitude. The satellite 100 will then drift (i.e., rotate) about the axis toward the target attitude. Slew controller 222 then performs another maneuver with the pair of thrusters 214-217 to stop the slew at the target attitude.

Figure 7:
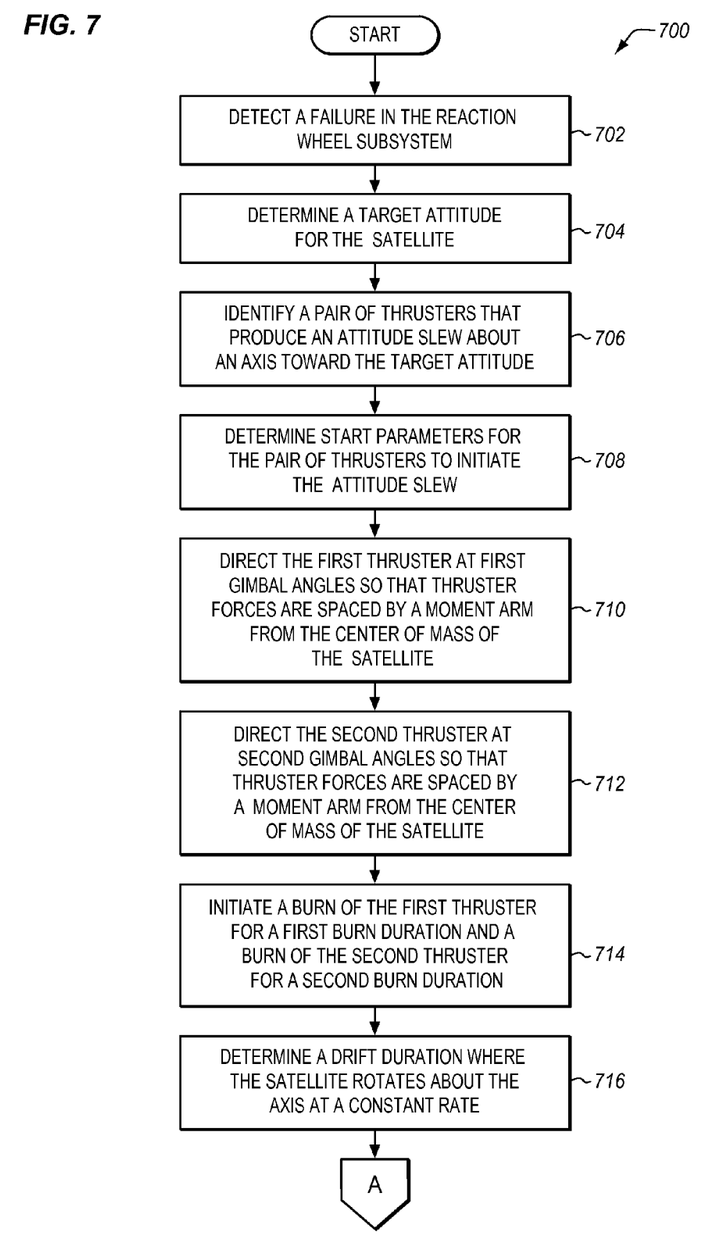
FIGS. 7-8 are flow charts illustrating a method for attitude control using a propulsion subsystem in an exemplary embodiment.
Figure 8:
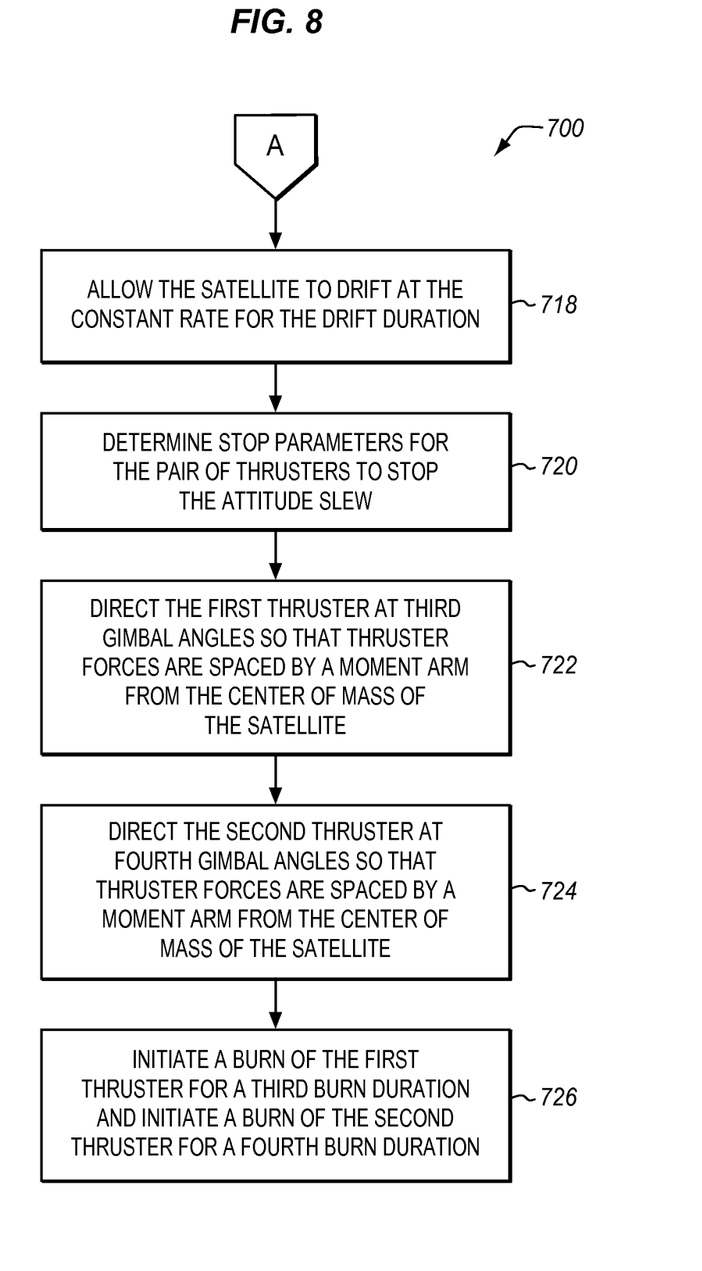

FIGS. 7-8 are flow charts illustrating a method 700 for attitude control using propulsion subsystem 212 in an exemplary embodiment. The steps of method 700 will be described with respect to satellite 100, although one skilled in the art will understand that the methods described herein may be performed for other satellites or systems not shown. The steps of the methods described herein are not all inclusive and may include other steps not shown. The steps for the flow charts shown herein may also be performed in an alternative order.

Slew controller 222 detects a failure in reaction wheel subsystem 202 (step 702). A failure in reaction wheel subsystem 202 may comprise a failure of one or more of the reaction wheels 204 that render reaction wheel subsystem 202 unable to perform attitude control. In response to the failure, slew controller 222 uses propulsion subsystem 212 for attitude control. To perform attitude control, slew controller 222 determines a target attitude for satellite 100 (step 704), which is the target orientation of satellite 100 in relation to a primary body (e.g., the Earth). For example, the target attitude for satellite 100 may be positive 90° along the pitch axis (see axis 603 in FIG. 6).

Slew controller 222 identifies a pair of thrusters (e.g., a first thruster and a second thruster) in propulsion subsystem 212 that produce an attitude slew of satellite 100 about an axis to toward the target attitude (step 706). To slew satellite 100 about the pitch axis, for example, a northwest-southwest pair of thrusters may be used, or a northeast-southeast pair of thrusters may be used (see FIGS. 5-6). Slew controller 222 determines start parameters for the pair of thrusters to initiate or begin the attitude slew (step 708 in FIG. 7). The start parameters may include a burn duration and gimbal angles for each of the thrusters being used in this maneuver to initiate the attitude slew. For instance, the start parameters may include first gimbal angles and a first burn duration for a first thruster of the pair, and second gimbal angles and a second burn duration for a second thruster of the pair. One way to determine the start parameters is with an iterative process or algorithm that is described in more detail below.

Based on the start parameters, slew controller 222 directs the first thruster at the first gimbal angles so that thruster forces from the first thruster are spaced by a moment arm from the center of mass 540 of satellite 100 (step 710). To direct the first thruster, slew controller 222 controls the gimbal assembly for the first thruster to orient the first thruster according to the first gimbal angles. Slew controller 222 also directs the second thruster at the second gimbal angles so that thruster forces from the second thruster are spaced by a moment arm from the center of mass 540 of satellite 100 (step 712). To direct the second thruster, slew controller 222 controls the gimbal assembly for the second thruster to orient the second thruster according to the second gimbal angles. The moment arms formed by the thruster forces act to rotate satellite 100 about the desired axis. Slew controller 222 then initiates a burn of the first thruster for a first burn duration, and initiates a burn of the second thruster for a second burn duration (step 714).

The burns of the first thruster and the second thruster cause an angular momentum change about the desired axis toward the target attitude. Slew controller 222 also determines a drift duration where satellite 100 rotates about the axis toward the target attitude at a constant rate (step 716). Responsive to the initial maneuver to cause a momentum change, satellite 100 will rotate about the axis at a slew rate (i.e., angular velocity). The time that satellite 100 rotates about the axis at the slew rate is referred to herein as the drift duration. Slew controller 222 allows satellite 100 to drift (rotational drift as opposed to linear drift) at the constant rate for the drift duration (step 718 in FIG. 8).

In order to stop or decelerate the rotation of satellite 100 at or near the target attitude, slew controller 222 initiates another maneuver with the pair of thrusters (see FIG. 8). For this maneuver, slew controller 222 determines stop parameters for the pair of thrusters to decelerate or stop the attitude slew of satellite 100 (step 720). The same pair of thrusters is used to stop the attitude slew as was used to start the attitude slew. The stop parameters may include a burn duration and gimbal angles for each of the thrusters being used in this maneuver to stop the attitude slew. For instance, the stop parameters may include third gimbal angles and a third burn duration for the first thruster of the pair, and fourth gimbal angles and a fourth burn duration for the second thruster of the pair.

Based on the stop parameters, slew controller 222 directs the first thruster at the third gimbal angles so that thruster forces from the first thruster are spaced by a moment arm from the center of mass 540 of satellite 100 (step 722). Slew controller 222 also directs the second thruster at the fourth gimbal angles so that thruster forces from the second thruster are spaced by a moment arm from the center of mass 540 of satellite 100 (step 724). Slew controller 222 then initiates a burn of the first thruster for a third burn duration, and initiates a burn of the second thruster for a fourth burn duration (step 726). The maneuver based on the stop parameters counteracts the rotation of satellite 100 so that the slew stops at or near the target attitude.

The maneuvers of propulsion subsystem 212 are able to slew satellite 100 about any axis so that attitude control may be maintained even when reaction wheel subsystem 202 fails. Also, the thrusters 214-217 used in these maneuvers are low-thrust so that the maneuvers can be performed with a limited amount of fuel. Therefore, satellite 100 can advantageously stay in service for an extended period of time after failure of reaction wheel subsystem 202.

In one embodiment, slew controller 222 may determine the start parameters and/or stop parameters for the attitude slew based on an iterative process. The following describes an exemplary iterative process for determining the parameters. To determine the parameters for a maneuver with a pair of thrusters, slew controller 222 first determines a slew rate for the maneuver to achieve the target attitude. Slew controller 222 can then determine a target momentum change for satellite 100 based on the slew rate and the moment of inertia of satellite 100.

Slew controller 222 may then use the iterative process to approximate a momentum change (referred to herein as an iteration momentum change) as the burn durations and gimbal angles of the pair of thrusters are adjusted. An equation used to predict the momentum change $\vec{h}^b$ when a pair of thrusters are fired is given by:

$$t_1(\vec{r}_1^b \times \vec{f}_1^b) + t_2(\vec{r}_2^b \times \vec{f}_2^b) = \vec{h}^b \qquad (1)$$

where $t_1$ and $t_2$ are the burn durations, $\vec{r}_1^b$ and $\vec{r}_2^b$ are the moment arm vectors in the body frame, and $\vec{f}_1^b$ and $\vec{f}_2^b$ are force vectors in the body frame due to two thrusters firing. The moment arms $\vec{r}_1^b$ and $\vec{r}_2^b$, and force vectors $\vec{f}_1^b$ and $\vec{f}_2{}^b$ are functions of the gimbal angles ($\rho$ and $\gamma$) of the two gimbal assemblies where the thrusters are mounted. The gimbal angles are calculated from knowing the geometry and direction cosine matrices of the gimbal assemblies, the gimbal angles, and the knowledge of the center of mass 540 of satellite 100. In reverse, if a force vector is known, a closed-form solution can be used to calculate the corresponding gimbal angles. Thus, in Equation (1), the knowns are the momentum change $\vec{h}^b$, the real unknowns are the burn durations $t_1$ and $t_2$, the gimbal angles $\rho_1$ and $\gamma_1$ of the first thruster, and the gimbal angles $\rho_2$ and $\gamma_2$ of the second thruster. The solution to Equation (1) has to satisfy some constraints. For example, during the attitude slew, it is desired to keep the net (linear) drift of satellite 100 to zero. The drift rate constraint equation is:

$$t_1\vec{f}_1{}^o(1)+t_2\vec{f}_2{}^o(1)=0 \tag{2}$$

where $\vec{f}_1{}^o(1)$ is the component of the first thrust force along the velocity direction in the orbit frame, and $\vec{f}_2{}^o(1)$ is the component of the second thrust force along the velocity direction in the orbit frame. This equation is equivalent to conserving the linear momentum along the velocity direction of the orbit frame. The orbit frame vectors can be calculated from the body frame vectors if the orbit-to-body transformation matrix is known. Other constraints include: the gimbal angles have to be within an operational range of the gimbal assemblies, and the burn durations have to be less than a specified value.

The solution of Equation (1), which meets the above constraints, is referred to as a feasible solution and it is obtained by an iterative process as shown below. It is also desired to have the least possible total burn duration. The minimization of the total burn time is achieved by starting the process of finding a feasible solution with a minimum initial burn time, trying several iterations of gimbal angles at the minimum initial burn time, and picking a feasible solution which has the smallest total burn time. The initial gimbal angles are selected such that the thrust vectors point through the center of mass 540, resulting in 0 Nms initial momentum change. These gimbal angles $\rho_0$ and $\gamma_0$ may be pre-calculated. Because one goal is to minimize the total burn duration, the process starts with a minimum $t_{1,0}$ and $t_{2,0}$. The burn durations are changed when the above constraints are violated (i.e., when the gimbal angles exceed an operational range). If the constraints are not violated, Equation (1) will eventually be satisfied with the present burn durations.

Assume at the $i^{th}$ iteration, the following variables are known: burn duration $t_{1,i}$ and $t_{2,i}$, the gimbal angles $\rho_{1,i}$ and $\gamma_{1,i}$ of the first thruster, and the gimbal angles $\rho_{2,i}$ and $\gamma_{2,i}$ of the second thruster. The corresponding moment arm vectors $\vec{r}_{1,i}{}^b$ and $\vec{r}_{2,i}{}^b$, and and the force vectors $\vec{f}_{1,i}{}^b$ and $\vec{f}_{2,i}{}^b$ may then be calculated. The corresponding momentum change equation can be written as:

$$t_{1,i}(\vec{r}_{1,i}{}^b \times \vec{f}_{1,i}{}^b)+t_{2,i}(\vec{r}_{2,i}{}^b \times \vec{f}_{2,i}{}^b)=\vec{h}_i{}^b \tag{3}$$

The error in the momentum change $\Delta\vec{h}_i{}^b$ is defined as:

$$\Delta\vec{h}_i{}^b=\vec{h}^b-\vec{h}_i{}^b \tag{4}$$

Where $\vec{h}^b$ represents the target momentum change, and $\vec{h}^b{}_i$ represents the iteration momentum change. Slew controller 222 compares the error in the momentum change $\Delta\vec{h}_i{}^b$ to a threshold to determine if this iteration provides a feasible solution. This error in momentum change is used to adjust the force vectors as follows until the error is less than a certain threshold. The following equations may be used to determine the force vector in the next iteration:

$$\vec{f}_{1,i+1}{}^b=\vec{f}_{1,i}{}^b+\lambda_{iter}{}^{xips}\delta\vec{f}_{1,i}{}^b$$

$$\vec{f}_{2,i+1}{}^b=\vec{f}_{2,i}{}^b+\lambda_{iter}{}^{xips}\delta\vec{f}_{2,i}{}^b \tag{5}$$

where $\delta\vec{f}_{1,i}{}^b$ and $\delta\vec{f}_{2,i}{}^b$ are the correction vectors that are a function of $\Delta\vec{h}_i{}^b$. $\lambda_{iter}{}^{xips}$ is a gain. Assuming $t_{1,i}$, $t_{2,i}$, $\vec{r}_{1,i}{}^b$ and $\vec{r}_{2,i}{}^b$ are fixed, $\delta\vec{f}_{1,i}{}^b$ and $\delta\vec{f}_{2,i}{}^b$ are related to $\Delta\vec{h}_i{}^b$ by:

$$t_{1,i}(\vec{r}_{1,i}{}^b \times \delta\vec{f}_{1,i}{}^b)+t_{2,i}(\vec{r}_{2,i}{}^b \times \delta\vec{f}_{2,i}{}^b)=\Delta\vec{h}_i{}^b \tag{6}$$

If the force vectors change, the moment arm vectors also change because they are a function of the same gimbal angles. However, these changes are small. Because the gimbal arms are small compared with the overall moment arm, the moment arm vectors do not change as much by moving gimbal angles. Using Equation (6) and matrix algebra, a minimum norm solution of $\delta\vec{f}_{1,i}{}^b$ and $\delta\vec{f}_{2,i}{}^b$ may be obtained as follows:

Define transition matrix A as:

$$A=[(t_{1,i}\vec{r}_{1,i}{}^b)\widetilde{\ }(t_{2,i}\vec{r}_{2,i}{}^b)\widetilde{\ }] \tag{7}$$

where $(\ )\widetilde{\ }$ is a tilde operator that forms a matrix which when multiplied by a vector, gives a result that is equivalent to a cross product. The minimum norm solution is then given by:

$$\begin{bmatrix}\delta\vec{f}_{1,i}{}^b \\ \delta\vec{f}_{2,i}{}^b\end{bmatrix} = A^T(A\ A^T)^{-1}\Delta\vec{h}_i{}^b \tag{8}$$

The new force vectors $\vec{f}_{1,i+1}{}^b$ and $\vec{f}_{2,i+1}{}^b$ are obtained by substituting $\delta\vec{f}_{1,i}{}^b$ and $\delta\vec{f}_{2,i}{}^b$ into Equation (5). The corresponding new gimbal angles $\rho_{1,i+1}$ and $\gamma_{1,i+1}$ for the first thruster, and $\rho_{2,i+1}$ and $\gamma_{2,i+1}$ for the second thruster can then be obtained in turn. The iterative process is repeated until the error in momentum change $\Delta\vec{h}_i{}^b$ becomes less than the threshold.

The burn durations may also be adjusted in the iterative process. If the gimbal angles exceed the constraint, the burn durations are increased by a small duration. The reason behind this is that by allowing more burn time, the gimbal angles will move into the acceptable region. Generally, the magnitude of the torque is smaller if the gimbal angles are in the acceptable region. Finally, the burn durations are adjusted to force the net drift of satellite 100 to zero as follows:

If $t_1 < -t_2 \dfrac{\vec{f}_2{}^o(1)}{\vec{f}_1{}^o(1)}$ $$t_1 = -t_2 \dfrac{\vec{f}_2{}^o(1)}{\vec{f}_1{}^o(1)}$$

else, $$t_2 = -t_1 \dfrac{\vec{f}_1{}^o(1)}{\vec{f}_2{}^o(1)}$$

For the iterative process, the following inputs are used: the selected pair of thrusters, the center of mass location in the body frame, locations of two gimbal assemblies in the body frame, the orientation of the gimbal assemblies with respect to the body, thruster location in the gimbal assemblies, direction of thrust in the gimbal assemblies, the orientation of gimbal axes ($\rho$ and $\gamma$) in the gimbal assemblies, the maximum and minimum allowed gimbal angles, the magnitude of thrust, and the desired momentum change vector in the body frame. The outputs of the iterative process are the gimbal angles ($\rho$ and $\gamma$) for the two gimbal assemblies, and the burn durations for the two thrusters.

Figure 9:
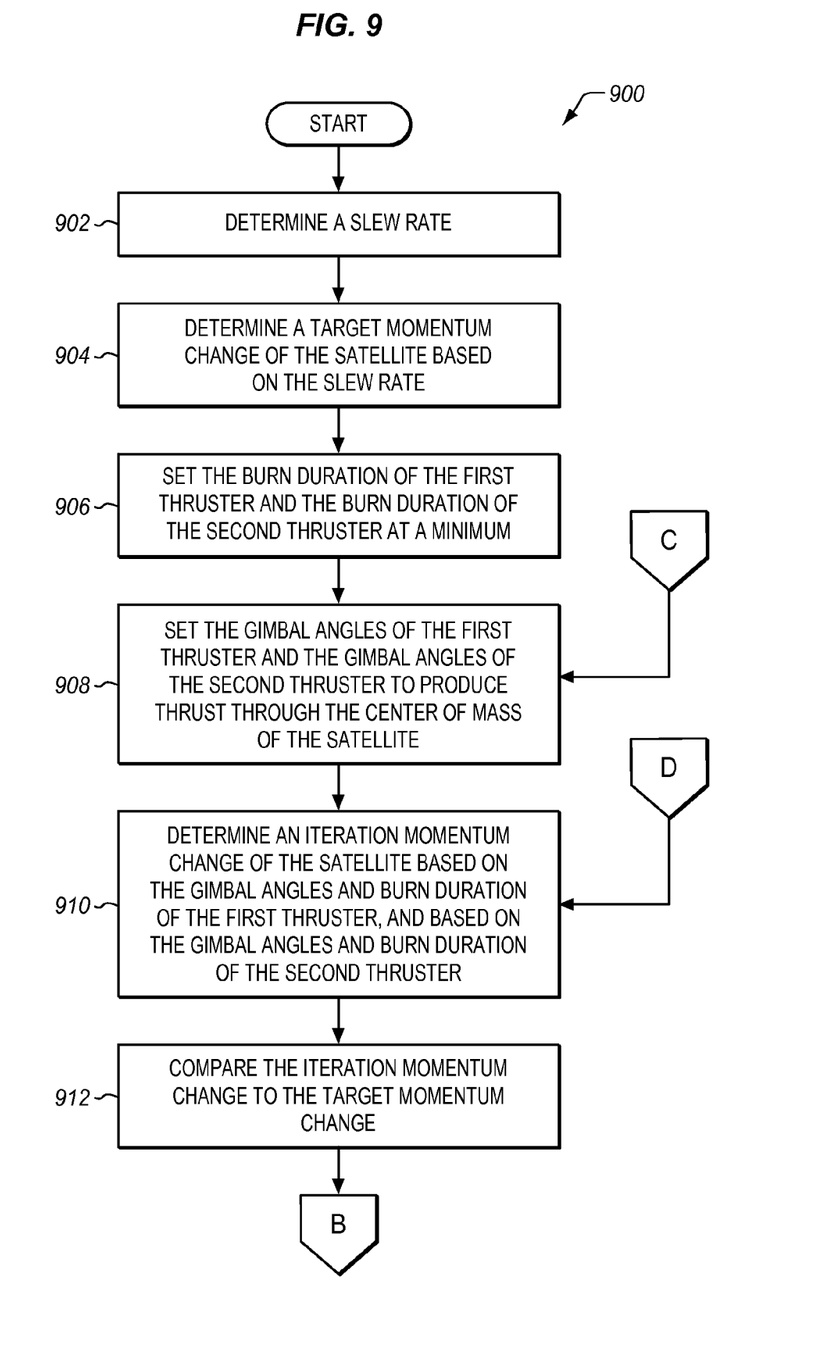
FIGS. 9-10 are flow charts illustrating a method for determining parameters for an attitude slew in an exemplary embodiment.
Figure 10:
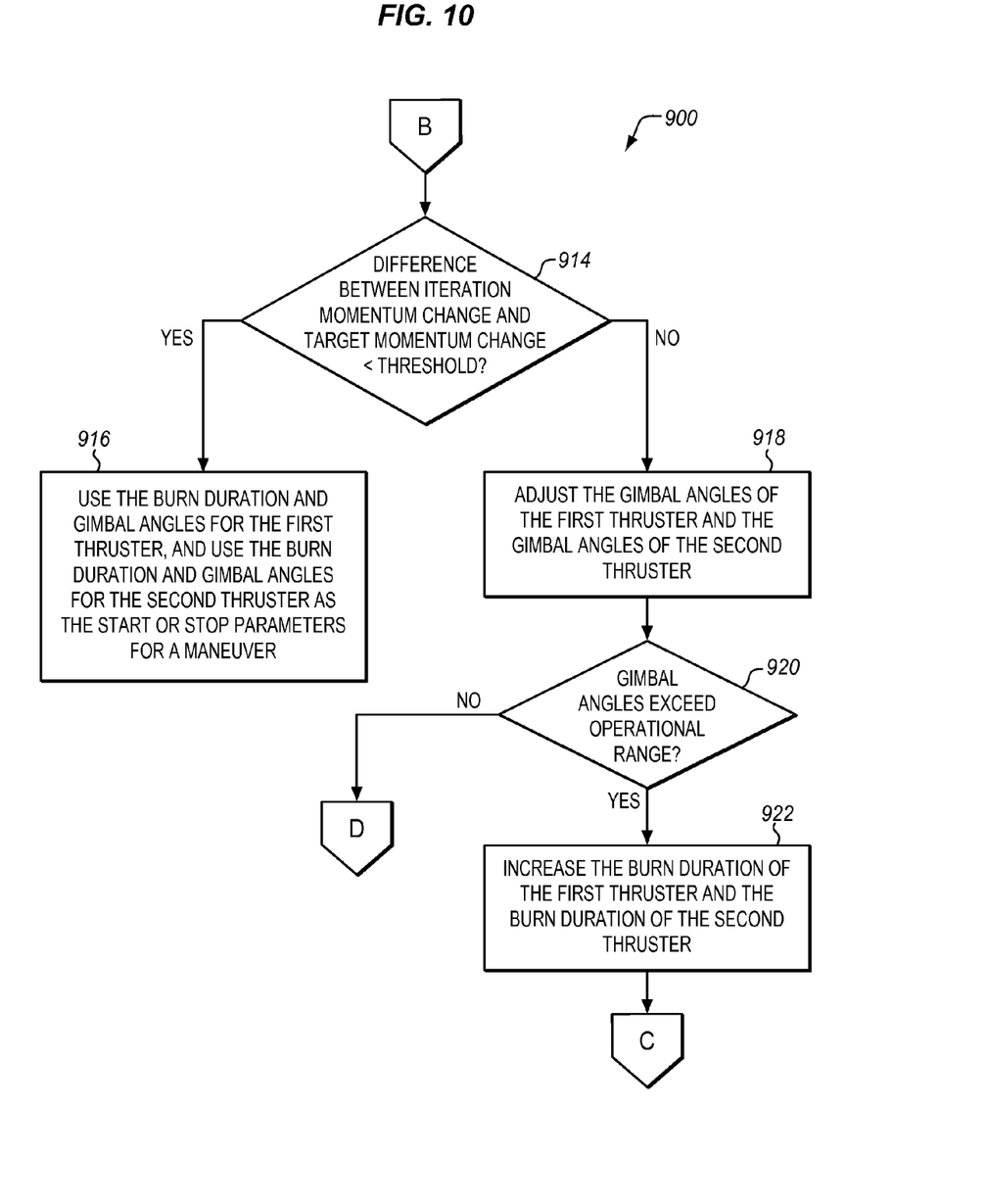

The iterative process is summarized by the method in FIGS. 9-10. FIGS. 9-10 are flow charts illustrating a method 900 for determining parameters for an attitude slew in an exemplary embodiment. The steps of method 900 will be described with respect to satellite 100, although one skilled in the art will understand that the methods described herein may be performed for other satellites or systems not shown. Slew controller 222 determines a slew rate for the maneuver (step 902). Slew controller 222 also determines a target momentum change of satellite 100 based on the slew rate (step 904). Slew controller 222 also sets the burn duration of the first thruster and the burn duration of the second thruster at a minimum (step 906). The minimum duration may be designated as desired, such as 1 second, 2 seconds, 10 seconds, etc. Slew controller 222 sets the gimbal angles of the first thruster and the gimbal angles of the second thruster to produce thrust through the center of mass 540 of satellite 100 (step 908).

Slew controller 222 then determines a momentum change of satellite 100 based on the gimbal angles and burn duration of the first thruster, and based on the gimbal angles and burn duration of the second thruster for this iteration of the process (step 910). The momentum change for an iteration of the process is referred to as an iteration momentum change. For example, slew controller 222 may use Equation (3) above to determine the iteration momentum change. Slew controller 222 is able to relate the force vector and the moment arm vector for the first thruster to the gimbal angles of the first thruster. Slew controller 222 is also able to relate the force vector and the moment arm vector for the second thruster to the gimbal angles of the second thruster. Slew controller 222 then compares the iteration momentum change to the target momentum change (step 912). Slew controller 222 determines whether the difference between the iteration momentum change and the target momentum change is less than a threshold (step 914 in FIG. 10). When the difference is less than the threshold, the iterative process has yielded a feasible solution. Thus, slew controller 222 is able to use the burn duration and gimbal angles for the first thruster, and use the burn duration and gimbal angles for the second thruster as the start or stop parameters for a maneuver (step 916). When the difference is greater than the threshold, the iterative process has not yielded a feasible solution. Thus, slew controller 222 adjusts the gimbal angles of the first thruster and the gimbal angles of the second thruster for the next iteration (step 918).

Slew controller 222 also determines if the gimbal angles exceed an operational range (step 920). Each gimbal assembly has a range that it can move along the two axes, and one constraint on the iterative process is that the gimbal angles cannot exceed the operational ranges of the gimbal assemblies. If the gimbal angles of this iteration exceed the operational range, then slew controller 222 increases the burn duration of the first thruster and the burn duration of the second thruster (step 922). Method 900 then returns to step 908. If the gimbal angles of this iteration do not exceed the operational range, then method 900 returns to step 910 in FIG. 9. Slew controller 222 continues the iterative process until it yields a feasible solution.

Example

Assume for this example that the reaction wheels 204 of satellite 100 are not available due to wheel failure (see FIG. 2). Also assume that satellite 100 needs to perform an emergent 90° positive pitch slew for some safety issue. Slew controller 222 selects a pair of thrusters (e.g., northwest and southwest) that provide the most efficient way to generate a positive pitch slew. Slew controller 222 then determines the parameters for starting the maneuver. It may also be assumed that the pitch inertia for satellite 100 is about 3,641 kg-m$^2$, and the desired slew rate is about 0.0244°/sec. Slew controller 222 may determine that the angular momentum change needed for satellite 100 to reach that slew rate would be:

$$(0.0244)(\pi/180)(3641)=1.55 \text{ Nms}$$

However, for a real thruster, it takes time for the torque to build up to the desired momentum change level. The loss of momentum (and thus the resulting rate) is estimated to be 5%. Thus, in order to pre-compensate for that loss, 5% is added to the desired momentum change:

$$1.55*(1+0.05)=1.63 \text{ NMs}$$

Slew controller 222 inputs this information into the iterative process to output the following parameters:
firing the first thruster for 200 seconds with $\rho=8.344°$ and $\gamma=5.9364°$; and
firing the second thruster for 200 seconds with $\rho=6.057°$ and $\gamma=8.1557°$ This maneuver changes the momentum of satellite 100 from 0 Nms to 1.63 Nms so the pitch rate goes from 0°/sec to 0.0244°/sec. Satellite 100 then slews toward the 90° pitch target. When satellite 100 gets close to the pitch target, satellite 100 decelerates so it stops close to the 90° pitch. To stop satellite 100, the same two thrusters are selected. Slew controller 222 inputs the momentum change from 1.63 Nms to 0 Nms into the iterative process to output the following parameters:
firing the first thruster for 200 seconds with $\rho=7.8682°$ and $\gamma=10.4308°$; and
firing the second thruster for 200 seconds with $\rho=10.5915°$ and $\gamma=7.5684°$.

Slew controller 222 has determined the acceleration time (200 sec), the deceleration time (200 sec), and the slew rate (0.0244°/sec). In order to determine the drift duration t so that the total slew angle is 90°, slew controller 222 may solve the following equation:

$$(\tfrac{1}{2})(0.0244)(200)+(0.0244)t+(\tfrac{1}{2})(0.0244)(200)=90$$

The solution for t in this example is 3,488 seconds. Slew controller 222 may then initiate the maneuvers using the burn durations and gimbal angles determined for the start maneuver, the burn durations and gimbal angles determined for the stop maneuver, and the drift duration of 3,488 seconds. These parameters will provide the desired 90° pitch slew on satellite 100.

Figure 11:
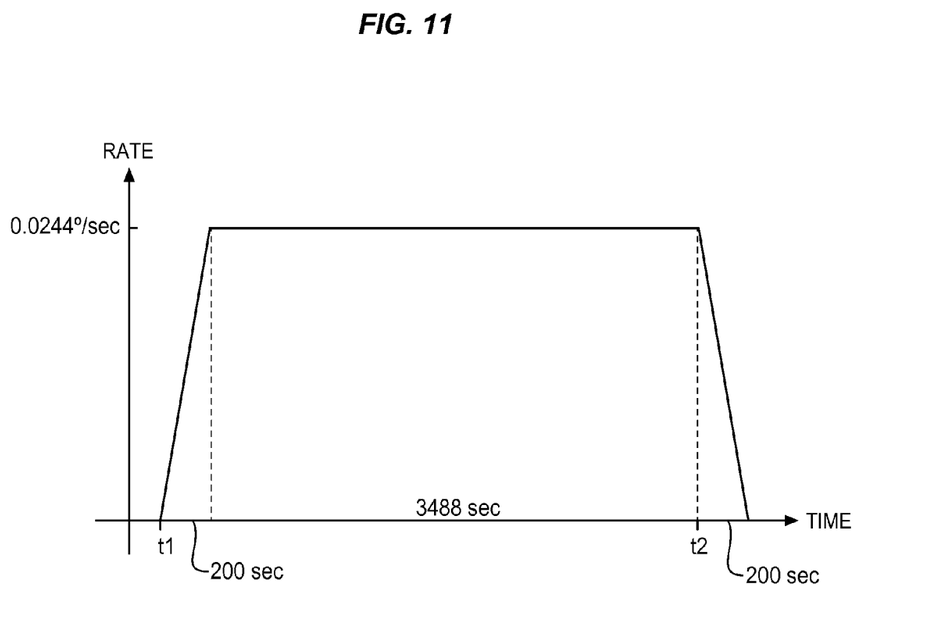
FIG. 11 illustrates the timing of the start and stop maneuvers in an exemplary embodiment.

FIG. 11 illustrates the timing of the start and stop maneuvers in an exemplary embodiment. Slew controller 222 initiates the start maneuver at time t1. For the start maneuver, slew controller 222 fires the first thruster for 200 seconds with $\rho=8.344°$ and $\gamma=5.9364°$, and fires the second thruster for 200 seconds with $\rho=6.057°$ and $\gamma=8.1557°$. This firing or acceleration time of 200 seconds achieves a slew rate of 0.0244°/sec. After the acceleration time, slew controller 222 allows satellite 100 to drift at this slew rate for 3488 seconds. After the drift duration, slew controller 222 initiates the stop maneuver at time t2. For the stop maneuver, slew controller 222 fires the first thruster for 200 seconds with ρ=7.8682° and γ=10.4308°, and fires the second thruster for 200 seconds with ρ=10.5915° and γ=7.5684°. After the stop maneuver, satellite 100 will be at the target attitude.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A space vehicle comprising:
a bus having a nadir side and a zenith side opposite the nadir side;
a reaction wheel subsystem that includes a plurality of reaction wheels for controlling attitude of the space vehicle;
a propulsion subsystem that includes a plurality of thrusters installed on the zenith side of the bus each having a thrust less than 0.1 Newton, wherein each of the thrusters is coupled to the bus by a two-axis gimbal assembly; and
a slew controller coupled to the reaction wheel subsystem and the propulsion subsystem;
the slew controller is configured to detect a failure in the reaction wheel subsystem;
in response to the failure, the slew controller is configured to:
determine a target attitude for the space vehicle;
identify a first thruster and a second thruster of the plurality of thrusters that produce an attitude slew of the space vehicle about an axis toward the target attitude;
determine start parameters for the first thruster and the second thruster to initiate the attitude slew about the axis;
direct the first thruster at first gimbal angles based on the start parameters so that thruster forces from the first thruster are spaced by a first moment arm from a center of mass of the space vehicle;
direct the second thruster at second gimbal angles based on the start parameters so that thruster forces from the second thruster are spaced by a second moment arm from the center of mass;
initiate a burn of the first thruster for a first burn duration based on the start parameters; and
initiate a burn of the second thruster for a second burn duration based on the start parameters.

2. The space vehicle of claim 1 wherein:
the slew controller is configured to determine the start parameters by:
determining a slew rate for the attitude slew;
determining a target momentum change of the space vehicle based on the slew rate;
setting the first burn duration of the first thruster and the second burn duration of the second thruster at a minimum;
setting the first gimbal angles of the first thruster and the second gimbal angles of the second thruster to produce thrust through the center of mass; and
performing an iterative process of:
determining an iteration momentum change of the space vehicle based on the first burn duration and the first gimbal angles of the first thruster and based on the second burn duration and the second gimbal angles of the second thruster;
comparing the iteration momentum change to the target momentum change;
using the first burn duration and the first gimbal angles of the first thruster, and the second burn duration and the second gimbal angles of the second thruster as the start parameters when a difference between the iteration momentum change and the target momentum change is less than a threshold; and
adjusting the first gimbal angles of the first thruster and the second gimbal angles of the second thruster when the difference between the iteration momentum change and the target momentum change is greater than the threshold.

3. The space vehicle of claim 2 wherein:
the slew controller is configured to determine the start parameters by:
increasing the first burn duration of the first thruster and the second burn duration of the second thruster when the difference between the iteration momentum change and the target momentum change is greater than the threshold and the first gimbal angles or the second gimbal angles exceed an operational range;
setting the first gimbal angles of the first thruster and the second gimbal angles of the second thruster to produce thrust through the center of mass; and
repeating the iterative process.

4. The space vehicle of claim 2 wherein:
the slew controller is configured to determine the iteration momentum change of the space vehicle using:

$$\vec{h}^b = t_1(\vec{r}_1^b \times \vec{f}_1^b) + t_2(\vec{r}_2^b \times \vec{f}_2^b)$$

where $t_1$ is the first burn duration of the first thruster, $t_2$ is the second burn duration of the second thruster, $\vec{f}_1^{\,b}$ is a force vector for the first thruster, $\vec{r}_1^{\,b}$ is a moment arm vector between the force vector for the first thruster and the center of mass, $\vec{f}_2^{\,b}$ is a force vector for the second thruster, and $\vec{r}_2^{\,b}$ is a moment arm vector between the force vector for the second thruster and the center of mass.

5. The space vehicle of claim 4 wherein:
the slew controller is configured to relate the force vector and the moment arm vector for the first thruster to the first gimbal angles for the first thruster, and to relate the force vector and the moment arm vector for the second thruster to the second gimbal angles for the second thruster.

6. The space vehicle of claim 4 wherein:
the slew controller is configured to determine the start parameters with the iterative process based on a constraint that:

$$t_1 \vec{f}_1^{\,o} + t_2 \vec{f}_2^{\,o} = 0.$$

7. The space vehicle of claim 1 wherein:
the slew controller is configured to determine a drift duration where the space vehicle rotates about the axis at a constant rate, and allow the space vehicle to drift for the drift duration.

8. The space vehicle of claim 7 wherein:
the slew controller is configured to:
determine stop parameters for the first thruster and the second thruster to stop the attitude slew after the drift duration to achieve the target attitude;
direct the first thruster at third gimbal angles based on the stop parameters so that the thruster forces from the first thruster are spaced by a third moment arm from the center of mass;
direct the second thruster at fourth gimbal angles based on the stop parameters so that the thruster forces from the second thruster are spaced by a fourth moment arm from the center of mass;
initiate a burn of the first thruster for a third burn duration based on the stop parameters; and
initiate a burn of the second thruster for a fourth burn duration based on the stop parameters.

9. The space vehicle of claim 8 wherein:
the slew controller is configured to determine the stop parameters by:
determining a target momentum change of the space vehicle;
setting the third burn duration of the first thruster and the fourth burn duration of the second thruster at a minimum;
setting the third gimbal angles of the first thruster and the fourth gimbal angles of the second thruster to produce thrust through the center of mass; and
performing an iterative process of:
determining an iteration momentum change of the space vehicle based on the third burn duration and the third gimbal angles of the first thruster and based on the fourth burn duration and the fourth gimbal angles of the second thruster;
comparing the iteration momentum change to the target momentum change;
using the third burn duration and the third gimbal angles of the first thruster, and the fourth burn duration and the fourth gimbal angles of the second thruster as the stop parameters when a difference between the iteration momentum change and the target momentum change is less than a threshold; and
adjusting the third gimbal angles of the first thruster and the fourth gimbal angles of the second thruster when the difference between the iteration momentum change and the target momentum change is greater than the threshold.

10. The space vehicle of claim 9 wherein:
the slew controller is configured to determine the stop parameters by:
increasing the third burn duration of the first thruster and the fourth burn duration of the second thruster when the difference between the iteration momentum change and the target momentum change is greater than the threshold and the third gimbal angles or the fourth gimbal angles exceed an operational range;
setting the third gimbal angles of the first thruster and the fourth gimbal angles of the second thruster to produce thrust through the center of mass; and
repeating the iterative process.

11. The space vehicle of claim 1 wherein:
the plurality of thrusters includes a northwest thruster, a northeast thruster, a southwest thruster, and a southeast thruster installed on the zenith side of the bus.

12. The space vehicle of claim 1 wherein:
the thrusters comprise electric thrusters.

13. The space vehicle of claim 12 wherein:
the electric thrusters use xenon as a propellant.

14. A method for attitude control of a space vehicle, wherein the space vehicle comprises a bus having a nadir side and a zenith side opposite the nadir side, a reaction wheel subsystem that includes a plurality of reaction wheels for controlling attitude of the space vehicle, and a propulsion subsystem that includes a plurality of thrusters installed on the zenith side of the bus each having a thrust less than 0.1 Newton, wherein each of the thrusters is coupled to the bus by a two-axis gimbal assembly, the method comprising:
detecting a failure in the reaction wheel subsystem;
in response to the failure:
determining a target attitude for the space vehicle;
identifying a first thruster and a second thruster of the plurality of thrusters that produce an attitude slew of the space vehicle about an axis toward the target attitude;
determining start parameters for the first thruster and the second thruster to initiate the attitude slew about the axis;
directing the first thruster at first gimbal angles based on the start parameters so that thruster forces from the first thruster are spaced by a first moment arm from a center of mass of the space vehicle;
directing the second thruster at second gimbal angles based on the start parameters so that thruster forces from the second thruster are spaced by a second moment arm from the center of mass;
initiating a burn of the first thruster for a first burn duration based on the start parameters; and
initiating a burn of the second thruster for a second burn duration based on the start parameters.

15. The method of claim 14 wherein determining the start parameters comprises:
determining a slew rate for the attitude slew;
determining a target momentum change of the space vehicle based on the slew rate;

setting the first burn duration of the first thruster and the second burn duration of the second thruster at a minimum;
setting the first gimbal angles of the first thruster and the second gimbal angles of the second thruster to produce thrust through the center of mass; and
performing an iterative process of:
  determining an iteration momentum change of the space vehicle based on the first burn duration and the first gimbal angles of the first thruster and based on the second burn duration and the second gimbal angles of the second thruster;
  comparing the iteration momentum change to the target momentum change;
  using the first burn duration and the first gimbal angles of the first thruster, and the second burn duration and the second gimbal angles of the second thruster as the start parameters when a difference between the iteration momentum change and the target momentum change is less than a threshold; and
  adjusting the first gimbal angles of the first thruster and the second gimbal angles of the second thruster when the difference between the iteration momentum change and the target momentum change is greater than the threshold.

16. The method of claim 15 further comprising:
increasing the first burn duration of the first thruster and the second burn duration of the second thruster when the difference between the iteration momentum change and the target momentum change is greater than the threshold and the first gimbal angles or the second gimbal angles exceed an operational range;
setting the first gimbal angles of the first thruster and the second gimbal angles of the second thruster to produce thrust through the center of mass; and
repeating the iterative process.

17. The method of claim 15 wherein determining the iteration momentum change comprises:
determining the iteration momentum change of the space vehicle using:

$$\vec{h}^b = t_1(\vec{r}_1^b \times \vec{f}_1^b) + t_2(\vec{r}_2^b \times \vec{f}_2^b)$$

where $t_1$ is the first burn duration of the first thruster, $t_2$ is the second burn duration of the second thruster, $\vec{f}_1^b$ is a force vector for the first thruster, $\vec{r}_1^b$ is a moment arm vector between the force vector for the first thruster and the center of mass, $\vec{f}_2^b$ is a force vector for the second thruster, and $\vec{r}_2^b$ is a moment arm vector between the force vector for the second thruster and the center of mass.

18. The method of claim 17 further comprising:
relating the force vector and the moment arm vector for the first thruster to the first gimbal angles for the first thruster; and
relating the force vector and the moment arm vector for the second thruster to the second gimbal angles for the second thruster.

19. The method of claim 17 wherein determining the start parameters comprises:
determining the start parameters with the iterative process based on a constraint that:

$$t_1\vec{f}_1^o + t_2\vec{f}_2^o = 0.$$

20. The method of claim 14 further comprising:
determining a drift duration where the space vehicle rotates about the axis at a constant rate; and
allowing the space vehicle to drift for the drift duration.

21. The method of claim 20 further comprising:
determining stop parameters for the first thruster and the second thruster to stop the attitude slew after the drift duration to achieve the target attitude;
directing the first thruster at third gimbal angles based on the stop parameters so that the thruster forces from the first thruster are spaced by a third moment arm from the center of mass;
directing the second thruster at fourth gimbal angles based on the stop parameters so that the thruster forces from the second thruster are spaced by a fourth moment arm from the center of mass;
initiating a burn of the first thruster for a third burn duration based on the stop parameters; and
initiating a burn of the second thruster for a fourth burn duration based on the stop parameters.

22. The method of claim 21 wherein determining the stop parameters comprises:
determining a target momentum change of the space vehicle;
setting the third burn duration of the first thruster and the fourth burn duration of the second thruster at a minimum;
setting the third gimbal angles of the first thruster and the fourth gimbal angles of the second thruster to produce thrust through the center of mass; and
performing an iterative process of:
  determining an iteration momentum change of the space vehicle based on the third burn duration and the third gimbal angles of the first thruster and based on the fourth burn duration and the fourth gimbal angles of the second thruster;
  comparing the iteration momentum change to the target momentum change;
  using the third burn duration and the third gimbal angles of the first thruster, and the fourth burn duration and the fourth gimbal angles of the second thruster as the stop parameters when a difference between the iteration momentum change and the target momentum change is less than a threshold; and
  adjusting the third gimbal angles of the first thruster and the fourth gimbal angles of the second thruster when the difference between the iteration momentum change and the target momentum change is greater than the threshold.

23. The method of claim 22 further comprising:
increasing the third burn duration of the first thruster and the fourth burn duration of the second thruster when the difference between the iteration momentum change and the target momentum change is greater than the threshold and the third gimbal angles or the fourth gimbal angles exceed an operational range;
setting the third gimbal angles of the first thruster and the fourth gimbal angles of the second thruster to produce thrust through the center of mass; and
repeating the iterative process.

24. An apparatus comprising:
a slew controller configured to control attitude of a space vehicle, wherein the space vehicle comprises:
  a bus having a nadir side and a zenith side opposite the nadir side;

a reaction wheel subsystem that includes a plurality of reaction wheels for controlling attitude of the space vehicle; and a propulsion subsystem that includes a plurality of thrusters installed on the zenith side of the bus each having a thrust less than 0.1 Newton, wherein each of the thrusters is coupled to the bus by a two-axis gimbal assembly;

the slew controller is configured to detect a failure in the reaction wheel subsystem;

in response to the failure, the slew controller is configured to:

determine a target attitude for the space vehicle;

identify a first thruster and a second thruster of the plurality of thrusters that produce an attitude slew of the space vehicle about an axis toward the target attitude;

determine start parameters for the first thruster and the second thruster to initiate the attitude slew about the axis;

direct the first thruster at first gimbal angles based on the start parameters so that thruster forces from the first thruster are spaced by a first moment arm from a center of mass of the space vehicle;

direct the second thruster at second gimbal angles based on the start parameters so that thruster forces from the second thruster are spaced by a second moment arm from the center of mass;

initiate a burn of the first thruster for a first burn duration based on the start parameters; and initiate a burn of the second thruster for a second burn duration based on the start parameters.

25. The apparatus of claim 24 wherein:

the slew controller is configured to:

determine a drift duration where the space vehicle rotates about the axis at a constant rate;

determine stop parameters for the first thruster and the second thruster to stop the attitude slew after the drift duration to achieve the target attitude;

allow the space vehicle to drift for the drift duration;

direct the first thruster at third gimbal angles based on the stop parameters so that the thruster forces from the first thruster are spaced by a third moment arm from the center of mass;

direct the second thruster at fourth gimbal angles based on the stop parameters so that the thruster forces from the second thruster are spaced by a fourth moment arm from the center of mass;

initiate a burn of the first thruster for a third burn duration based on the stop parameters; and initiate a burn of the second thruster for a fourth burn duration based on the stop parameters.

* * * * *